(12) United States Patent
Massaguer et al.

(10) Patent No.: US 10,503,715 B1
(45) Date of Patent: Dec. 10, 2019

(54) APPLICATIONS SEARCH USING PROGRAMMATIC APPLICATION STATE INDEXING

(71) Applicant: Amazon Technologies, Inc., Seattle, WA (US)

(72) Inventors: Daniel Massaguer, Irvine, CA (US); Derek Steven Gebhard, Huntington Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 15/184,640

(22) Filed: Jun. 16, 2016

(51) Int. Cl.
*G06F 16/22* (2019.01)
*G06F 16/248* (2019.01)

(52) U.S. Cl.
CPC ........ *G06F 16/2228* (2019.01); *G06F 16/248* (2019.01)

(58) Field of Classification Search
CPC ........ G06F 17/30321; G06F 17/30554; G06Q 40/02
USPC .......................................................... 707/711
See application file for complete search history.

(56) References Cited

U.S. PATENT DOCUMENTS

| | | | |
|---|---|---|---|
| 9,483,388 B2 * | 11/2016 | Sankaranarasimhan | G06F 16/24575 |
| 10,015,282 B2 * | 7/2018 | Boyd | A63F 13/00 |
| 10,157,230 B2 * | 12/2018 | Glover | G06F 16/9535 |
| 2012/0124061 A1 * | 5/2012 | Macbeth | G06F 9/445 707/749 |
| 2013/0097706 A1 * | 4/2013 | Titonis | G06F 21/56 726/24 |
| 2013/0339137 A1 * | 12/2013 | Lempel | G06Q 30/02 705/14.49 |
| 2016/0188719 A1 * | 6/2016 | Glover | G06F 17/30864 707/706 |
| 2016/0335348 A1 * | 11/2016 | Desineni | G06F 17/30156 |
| 2016/0335349 A1 * | 11/2016 | Desineni | G06F 17/30156 |
| 2016/0357763 A1 * | 12/2016 | Salim | G06F 17/30867 |
| 2016/0357831 A1 * | 12/2016 | Linn | G06F 17/30867 |
| 2016/0357871 A1 * | 12/2016 | Prakash | G06F 17/30867 |
| 2017/0185608 A1 * | 6/2017 | Levi | G06F 3/0484 |
| 2018/0143844 A1 * | 5/2018 | Desineni | G06F 9/44521 |

OTHER PUBLICATIONS

U.S. Appl. No. 14/524,972, filed Oct. 27, 2014, First Named Inventor: Faizaan Kersi Marolia "Systematically Exploring Programs During Testing", 51 pages.

(Continued)

*Primary Examiner* — Robert W Beausoliel, Jr.
*Assistant Examiner* — Arthur Ganger
(74) *Attorney, Agent, or Firm* — Lee & Hayes, P.C.

(57) ABSTRACT

Technologies are disclosed for enabling application search through the use of programmatic application state indexing. The disclosed technologies enable applications to be systematically explored using a program to identify the various states of the application. For example, UI displays provided by an application can be explored and text or other content can be captured from each UI display. The text or other content can then be indexed and utilized to search applications and to navigate directly to specific application states.

20 Claims, 9 Drawing Sheets

(56) References Cited

OTHER PUBLICATIONS

Web article: "Firebase App Indexing", published by Google, 2016 [online][retrieved on: Jun. 8, 2016] retrieved from: https://developers.google.com/app-indexing/introduction#ios, 5 pps.
Web article: "Making Your App Content Searchable by Google" published by Android, 2016 [online][retrieved on: Jun. 8, 2016] retrieved from: http://developer.android.com/training/app-indexing/index.html, pages.

* cited by examiner

APPLICATIONS SEARCH USING PROGRAMMATIC APPLICATION STATE INDEXING

BACKGROUND

Some application development frameworks provide functionality for enabling a search engine to index an application in the same manner as it would index a web site. Using this functionality, a search engine can present deep links to an application in search results displayed on computing devices that have the application installed. The search engine can present an option for installing an application in search results displayed on computing devices that do not have the application installed.

Enabling application indexing can, however, require application developers to implement complex custom programming. Some application development frameworks also require the utilization of application programming interfaces ("APIs") or software development kits ("SDKs") in order to implement application indexing. Consequently, implementing application indexing using current mechanisms can require significant additional effort by a software developer. Implementing application indexing using current mechanisms can also increase the size and complexity of applications. As a result, these applications can require more memory and, potentially, more processor cycles for execution.

The disclosure made herein is presented with respect to these and other considerations.

DETAILED DESCRIPTION

Figure 1:
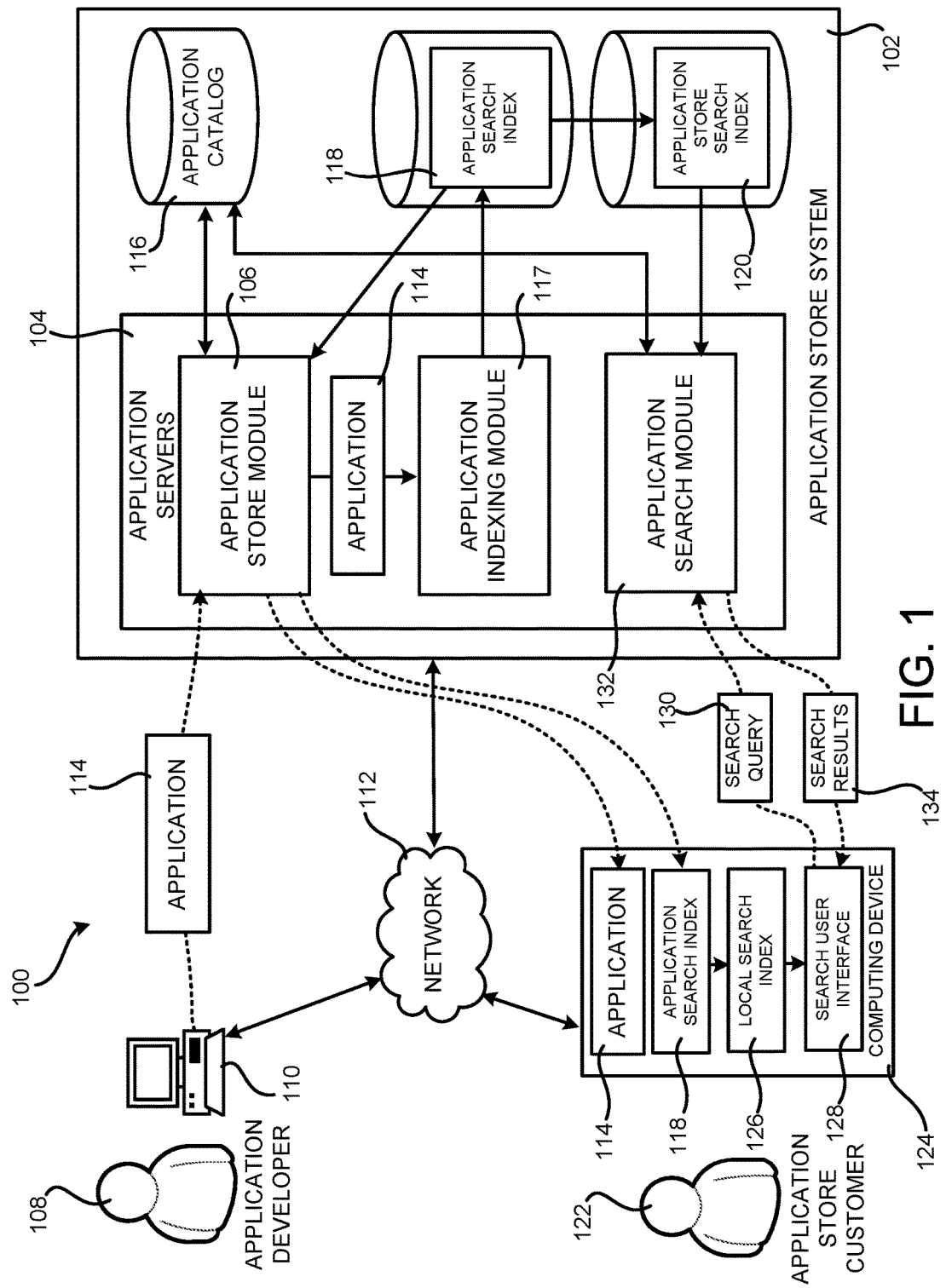
FIG. 1 is a software and network architecture diagram showing aspects of the configuration and utilization of an application store system configured to provide application search functionality using programmatic application state indexing, according to one particular configuration.

The following detailed description is directed to technologies for providing application search functionality using programmatic application state indexing. Through an implementation of the disclosed technologies, application indexing and search can be enabled through the utilization of programmatic application state indexing rather than through the use of custom programming, APIs, or SDKs. As a result, application searching can be enabled using the technologies disclosed herein in a manner that does not require any effort by a software developer or increase the size of an application or the processing requirements for executing the application. Technical benefits other than those specifically mentioned herein can also be realized through an implementation of the disclosed technologies.

The technologies disclosed herein are implemented in conjunction with the provision of an application store in one particular configuration. An application store allows users to browse, search, and purchase applications for use on their own computing devices. In order to enable this functionality, an application store can also allow application developers to submit applications for inclusion in the application store. As part of the application submission process, applications can be tested or otherwise evaluated in order to determine their suitability for inclusion in the application store.

In one configuration disclosed herein, programmatic application state indexing is utilized to index applications submitted to an application store. As described in greater detail below, programmatic application state indexing enables applications to be indexed for searching programmatically, and without the use of custom programming, APIs, or SDKs. In one particular configuration, for example, an application indexing module executing in conjunction with the provision of an application store causes an application to be installed on physical computing devices or device emulators The application is then launched and executed on the devices or device emulators.

Once the application has been executed on the devices or device emulators, the application indexing module, or another component, can systematically explore the application, without user interaction, to identify states (referred to herein as "application states" or "states") that correspond to unique screen displays generated by the application. For example, and without limitation, the application indexing module can simulate user interaction with UI elements displayed by the application to identify the application states.

In some examples, the systematic exploration performed by the application indexing module begins at one display screen and continues to other display screens generated as a result of programmatic interactions with UI elements on the screen displays provided by the application. For instance, the application indexing module can start its exploration of the application at the "home" screen of the program, and then move to another screen provided by the application by selection of a UI element on the home screen. This process can continue until all of the application states provided by an application have been identified.

In some configurations, the UI elements presented by an application on a screen display are identified programmatically. For example, the UI elements can be identified by using a graphical analysis mechanism (e.g., identification of certain graphical shapes), by programmatically examining program code for the application, or by simulating touch actions, or other actions, at various locations on a display screen.

The UI elements provided by an application can be of different types. For example, and without limitation, the UI elements can be UI elements that receive input (e.g. radio buttons, check boxes, or text boxes), UI elements that display content (e.g. images and text) but do not receive input, UI elements that receive a selection (e.g. a "submit" button), or UI elements that perform some other action. In some configurations, all or portion of the UI elements that are presented by an application can be interacted with programmatically in order to identify all of the application states. In some configurations, the interactions that can be programmatically performed include, but are not limited to, sending actions such as touch events, text entry, contextual selections, key-presses or button selections to the application.

Content can also be identified at each of the application states for inclusion in an application search index. For example, and without limitation, text can be identified at each application state for storage in an application search index. Once the application states and the content for the application states have been identified, an application search index can be generated. The application search index provides a mapping between the content (e.g. text) obtained at each application state and the application states themselves. Other types of content including images can also be identified at each application state and indexed in a similar manner.

As will be discussed in greater detail below, the application search index can be utilized to search for and navigate to individual application states. In order to enable this functionality, an application and its associated application search index can be provided to a computing device. The application search index can then be merged into a local search index on the computing device that contains application search indexes for other applications installed on the computing device.

A search user interface can also be provided by the computing device that provides functionality for searching the local search index. For example, and without limitation, a search query can be received that includes one or more search terms. A search can then be performed for the search terms in the local search index. Search results can be presented in the user interface that identify the applications and application states associated with the search terms in the local search index. If a user selects one of the search results, the associated application can be configured in the application state associated with the selected search result. In this way, a user can search the application states for the applications installed on their computing device and navigate directly from search results to a particular application state.

As will also be discussed in greater detail below, the application search index can also be utilized to search the applications available from an application store. In order to enable this functionality, the application search index is merged into an application store search index that contains application search indexes for other applications available from the application store. In this manner an application store search index can be created that maps content in application states to the applications states themselves for many applications (i.e. the applications available from an application store).

The search user interface described above, or another search UI, can also provide functionality for searching the application store search index. For example, and without limitation, a search query can be received that includes one or more search terms. A search can then be performed for the search terms in the application store search index. Search results can be presented in the user interface that identify the applications and, potentially, application states associated with the search terms in the application store search index.

If a user selects one of the search results, additional information regarding the application associated with the selected search result can be provided. In this way, content obtained from application states can be utilized to search applications available from an application store. Additional details regarding the various components and processes described briefly above for providing application search functionality using programmatic application state indexing will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of a computing environment 100 that includes an application store system 102 configured to provide application search functionality using programmatic application state indexing, according to one particular configuration. It is to be appreciated that the environment 100 is merely illustrative and that the various configurations disclosed herein can be utilized in many different types of computing environments.

The environment 100 includes an application store system 102 configured to provide an application store. As discussed briefly above, an application store is an electronic marketplace where customers can browse and purchase application programs for download and use on their own computing devices. The application store can offer applications for use on customer computing devices such as, but not limited to, smart phones, tablet computers, laptop or desktop computers, and/or other types of computing devices.

In order to provide an application store and the other functionality disclosed herein, the application store system 102 might include one or more application servers 104. The application servers 104 can execute a number of software components in order to provide the application store services described herein, including application search functionality using programmatic application state indexing. The software components can execute on a single application server 104 or in parallel across multiple application servers in the application store system 102. In addition, each software component can consist of a number of subcomponents executing on different application servers 104 or other computing devices in the application store system 102. Various components can be implemented as software, hardware, or any combination of the two. In this regard, it is to be appreciated that the application store system 102 shown in FIG. 1 has been simplified for discussion purposes and that many additional software and hardware components can be utilized.

A customer 122 of the application store can use a customer computing device 124 to access the application store system 102 through a network 112. The customer 122 can be an individual that desires to browse, purchase, or has purchased, one or more applications 114 from the application store provided by the application store system 102. The customer device 124 can be a smart phone, personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 112 and communicating with the application store system 102.

According to one configuration, an application store module 106 executes on the application servers 104. The application store module 106 provides functionality for permitting customers to browse and purchase applications available from the application store provided by the application store system 102. For instance, the application store module 106 can receive a browse request from a customer computing device 124 and, in response thereto, retrieve information regarding a particular application offered for sale from the application store system 102 referenced by the browse request, generate application information for the application, and transmit the application information over the network 112 to a client application (not shown in FIG. 1) executing on the computing device 124 for display to the customer 122. The application information can include a name of an application, the developer of the application, a text description of the application, one or more images of the application during execution, a price for the application, and other information. The application and associated application information can be stored in an application catalog 116 maintained by the application store system 102 for each application offered for sale.

The network 112 can be a local-area network ("LAN"), a wide-area network ("WAN"), the Internet, or any other networking topology known in the art that connects the customer devices 124 to the application store system 102. The customers 122 can use a client application (not shown) executing on their computing devices 124 to access and utilize the application store functionality provided by the application servers 104.

In one configuration, the client application is a World Wide Web ("web") browser application, such as the MOZILLA® FIREFOX® web browser from MOZILLA FOUNDATION of Mountain View, Calif. The web browser application exchanges data with the application servers 104 in the application store system 102 using the hypertext transfer protocol ("HTTP") over the network 112. The client application might also be a stand-alone client application configured for communicating with the application servers 104. The client application can also utilize any number of communication methods known in the art to communicate with the application store system 102 and/or the application servers 104 across the network 112, including remote procedure calls, SOAP-based web services, remote file access, proprietary client-server architectures, and the like.

The application store module 106 also provides functionality for allowing an application developer 108 to submit an application 114 for inclusion in the application store provided by the application store system 102. In this regard, the developer 102 can utilize a web browser application (not shown) executing on the developer computer 110 to access a web-based user interface provided by the application store module 106 for submitting an application 114 for inclusion in the application store. The developer 108 can also utilize other types of applications executing on the developer computer 110, such as a stand-alone client application configured for use with the application store, to submit an application 114 to the application store.

When applications 114 are submitted for inclusion in the application store provided by the application store system 102, the applications 114 can be tested or otherwise evaluated in order to determine their suitability for inclusion in the application store. In one configuration disclosed herein, for example, programmatic application state indexing is utilized to index applications 114 submitted to the application store. As described in greater detail below, programmatic application state indexing enables applications 114 to be indexed for searching programmatically, and without the use of custom programming, APIs, or SDKs. In one particular configuration, for example, an application indexing module 117 executing in the application store system 102 causes an application 114 submitted for inclusion to the application store to be installed on physical computing devices or device emulators (not shown in FIG. 1) in the application store system 102. The application 114 is then launched and executed on the devices or device emulators.

Once the application 114 has been executed on the devices or device emulators, the application indexing module 117, or another component, can systematically explore the application 114, without user interaction, to identify application states that correspond to unique screen displays generated by the application 114. For example, and without limitation, the application indexing module 117 can simulate user interaction with UI elements displayed by the application 114 to identify the application states.

In some examples, the systematic exploration performed by the application indexing module 117 begins at one display screen and continues to other display screens generated as a result of programmatic interactions with UI elements on the screen displays provided by the application 114. For instance, the application indexing module 117 can start its exploration of the application 114 at the "home" screen of the application 114, and then move to another screen provided by the application 114 by selection of a UI element on the home screen. This process can continue until all of the application states provided by the application 114 have been identified and indexed in the manner described below.

In some configurations, the UI elements presented by an application 114 on a display screen are identified programmatically. For example, the UI elements can be identified, without user interaction, using a graphical analysis mechanism (e.g., edge detection) that identifies one or more elements based on the shape of the UI element as it is displayed. In other configurations, the application indexing module 117 can randomly simulate interactions with different portions of the display screen to detect UI elements. For example, the application can inject tap events at various locations on a display screen currently generated by the application 114. In some configurations, the interactions that can be programmatically performed include, but are not limited to, sending actions such as touch events, text entry, contextual selections, key-presses or button selections to the application 114. In some configurations, all of the UI elements that are presented by an application 114 can be interacted with programmatically in order to identify all of the application states of the application 114.

It is to be appreciated that the UI elements provided by the application 114 can be of different types. For example, the UI elements can be UI elements that receive input (e.g. radio buttons, check boxes, or text boxes), UI elements that display content (e.g. images and text) but do not receive input, or UI elements that receive a selection (e.g. a "submit" button). Other types of UI elements that perform other types of actions can also be displayed and programmatically identified in other configurations.

In some configurations, the application indexing module 117 can also create a UI map (not shown in FIG. 1) that includes each of the screen displays that have been identified using the process described above. The UI map can include the screen displays explored by the application indexing module 117 and the links between the various screen displays. The links can be represented as the UI element on each display screen that is selected to cause the application to transition to another display screen (i.e. application state). As will be described in greater detail below, the UI map can be utilized to generate a state graph (also not shown in FIG. 1) identifying the various application states of the application 114. In turn, the state graph can be utilized to construct an application search index 118 for the application 114.

Additional details regarding construction of the UI map and the state graph will be provided below with regard to FIGS. 2A and 2B. Additional details regarding one illustrative mechanism for programmatically identifying application states can also be found in U.S. patent application Ser. No. 14/524,972, which was filed on Oct. 27, 2014 and entitled "Systematically Exploring Programs During Testing", and which is expressly incorporated herein by reference in its entirety.

The application indexing module 117 can also identify content at each of the application states for inclusion in the application search index 118. For example, and without limitation, text that is presented by the application 114 on each unique display screen can be identified. Other types of content such as graphical images can also be identified at each application state. Various types of processing can be performed on the graphical images to identify text associated with the images. For example, and without limitation, optical character recognition ("OCR") can be performed on the images to identify text contained therein. This text can then be added to the application search index 118 in the manner described below. As another example, image recognition can be performed on the images in order to identify content contained in the images. Text describing the identified content can then be added to the application search index 118 in the manner described below.

Once the application states and the content for the application states have been identified, the application indexing module 117 can store this information in the application search index 118. As discussed briefly above, the application search index 118 provides a mapping between the content (e.g. text) obtained at each application state and the application states themselves. In one configuration the application search index 118 is implemented as an inverted index. Other types of indexes can be utilized in other configurations. One specific example of an application search index 118 will be described below with regard to FIG. 2B.

As will be discussed in greater detail below, the application search index 118 can be utilized to search for and navigate to individual application states. In order to enable this functionality, an application 114 and its associated application search index 118 can be provided to a computing device, such as the computing device 124. The application search index 118 can then be merged into a local search index 126 on the computing device 124 that contains application search indices for other applications installed on the computing device 124.

In some configurations, the local search index 126 also includes application search indices for applications that are not installed on the computing device 124. For example, and without limitation, application search indices for popular applications in the application store can be stored in the local search index 126. In this way, local searching can be performed for application states provided by applications that are not currently on the computing device 124. In this regard, it is to be appreciated that the application search index 118 and the local search index 126 need not be stored on the computing device 124 to enable the functionality described herein. Rather, these items could be stored in the application store system 102 (or another network-accessible storage location), and searched remotely.

A search user interface 128 can also be provided by the computing device that provides functionality for searching the local search index 126. For example, and without limitation, a search query (not shown in FIG. 1) can be received from a user, such as the customer 122, that includes one or more search terms. A search can then be performed for the search terms in the local search index 126. Search results (not shown in FIG. 1) can be presented in the search user interface 128 that identify the applications 114 and the application states that are associated with the supplied search terms in the local search index 126. If a user selects one of the search results, the associated application 114 can be executed (if not already executing) and configured in the application state associated with the selected search result. In this way, a user can search the application states for the applications 114 installed on their computing device 124 and navigate directly from search results to a particular application state. Additional details regarding this process will be provided below with regard to FIG. 4.

As will also be discussed in greater detail below, the application search index 118 can also be utilized to search the applications 114 available from an application store. For example, and without limitation, the application search index 118 can be utilized to search applications in an application catalog 116 maintained by an application store. In order to enable this functionality, the application search index 118 is merged into an application store search index that contains application search indexes for other applications. In this manner an application store search index can be created that maps content in application states to the applications states themselves for many applications.

The search UI 128 described above, or another search UI provided by the computing device 124, can also provide functionality for searching the application store search index 120. For example, and without limitation, a search query 130 can be received from a user, such as the customer 122, that includes one or more search terms. The search query 130 can then be transmitted to an application search module 132 executing in the application store system 102 in order to initiate a search of the application store search index 120 for the search terms in the search query 130. Search results 134 can be transmitted to the computing device 124 and presented in the search UI 128 that identify the applications 114 and, potentially, application states associated with the search terms that were located in the application store search index 120.

If a user selects one of the search results, additional information regarding the application 114 associated with the selected search result can be provided. In this way, content presented in application states can be utilized to search applications 114 available from an application store. Additional details regarding the various processes described above with regard to FIG. 1 will be provided below with regard to FIGS. 2A-8.

It is to be appreciated that, in one configuration, the functionality described above as being performed by the application search module 132 could be performed on the developer computing device 110 in some configurations. For example, and without limitation, the process for programmatically generating an application search index 118 could be performed by a development environment executing on the developer computing device 110. In this configuration, the application search index 118 can be provided to the application store module 106 with the submission of the application 114 for inclusion in the application store. A developer-supplied programmatically generated application search index 118 can be utilized in the same manner as an application search index 118 generated by the application indexing module 117 in the application store system 102. Other configurations can also be utilized.

Figure 2A:
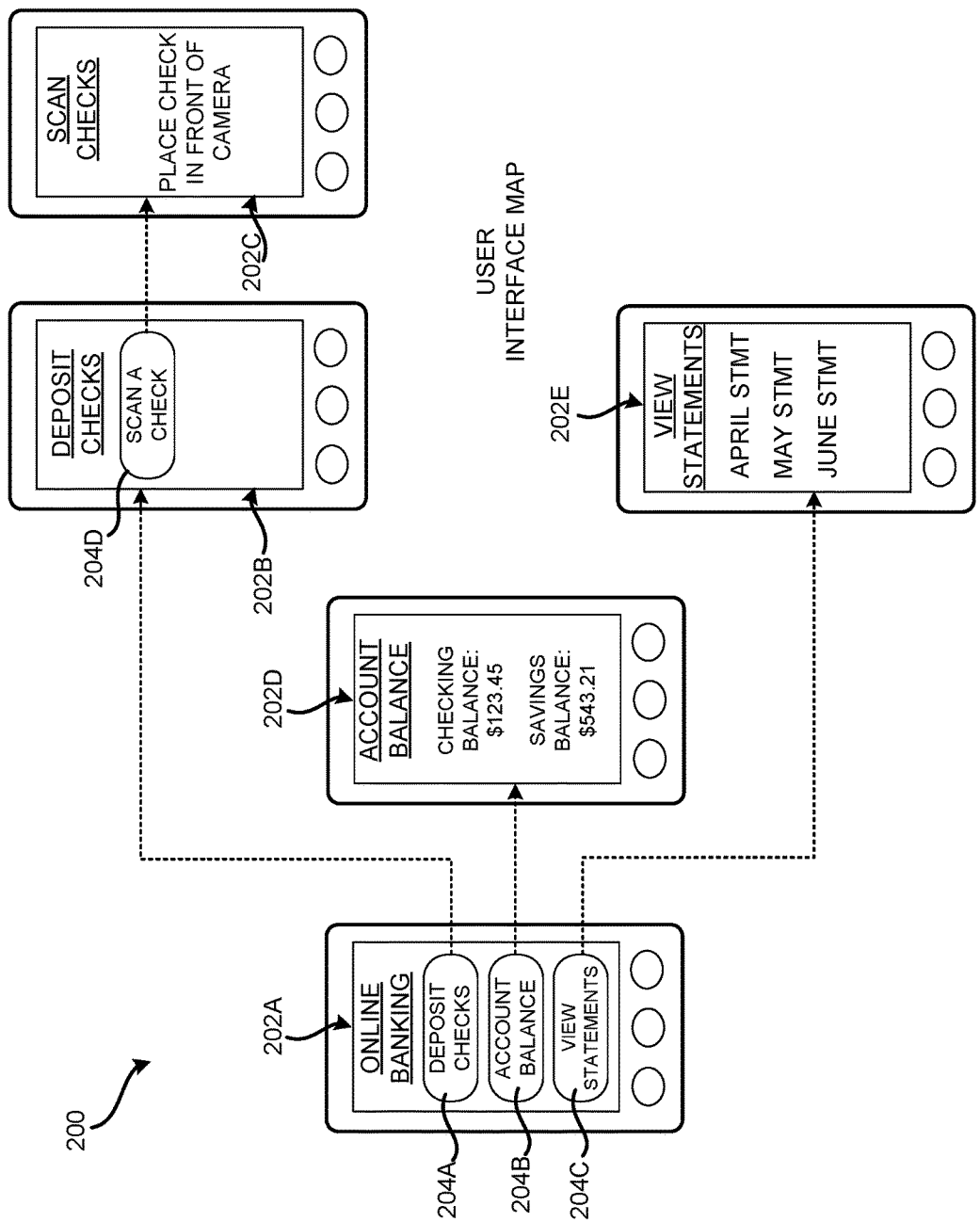
FIG. 2A is a user interface map showing several application states provided by an illustrative application, according to one particular configuration.

FIG. 2A is a UI map 200 showing the various application states provided by an illustrative application 114, according to one particular configuration. In the example shown in FIG. 2A, an online banking application 114 has been submitted by a developer 108 for inclusion in the application store provided by the application store system 102. Responsive thereto, the application indexing module 117 has performed the process for programmatically and systematically identifying application states described above. For instance, the application indexing module 117 might begin its analysis of the online banking application at a "home" screen display 202A. Several UI elements 204A-204C are provided on the screen display 202A.

The application indexing module 117 can simulate user interaction with the UI elements 204A-204C in order to identify other application states. For instance, if user interaction, such as a touch gesture or a mouse click, is simulated with respect to the UI element 204A, the application 114 will transition to the application state represented by the screen display 202B. If user interaction is simulated with respect to the UI element 204B, the application 114 will transition to the application state represented by the screen display 202D. Similarly, if user interaction is simulated with respect to the UI element 204C, the application 114 will transition to the application state represented by the screen display 202E. If user interaction is simulated with respect to the UI element 204D, the application 114 will transition to the application state represented by the screen display 202C. By simulating user interaction with the UI elements 204A-204D, all of the states of the online banking application can be programmatically identified.

As also discussed briefly above, the application indexing module 117 can also collect content, such as text, at each of the application states for inclusion in the application search index 118. For instance, the application indexing module 117 might collect the text "ONLINE BANKING" from the screen display 202A, might collect the text "DEPOSIT TEXT" from the screen display 202B, might collect the text "SCAN CHECKS" from the screen display 202C, might collect the text "ACCOUNT BALANCE", "CHECKING BALANCE", and "SAVINGS BALANCE" from the screen display 202D, and might collect the text "VIEW STATEMENTS" from the screen display 202E. Other types of content can also be obtained from the screen displays 202A-202E in a similar manner. This content can then be associated with its respective state and stored in the application search index 118. An illustrative state graph and a corresponding application search index 118 for the UI map 200 shown in FIG. 2A will be described below with regard to FIG. 2B.

Figure 2B:
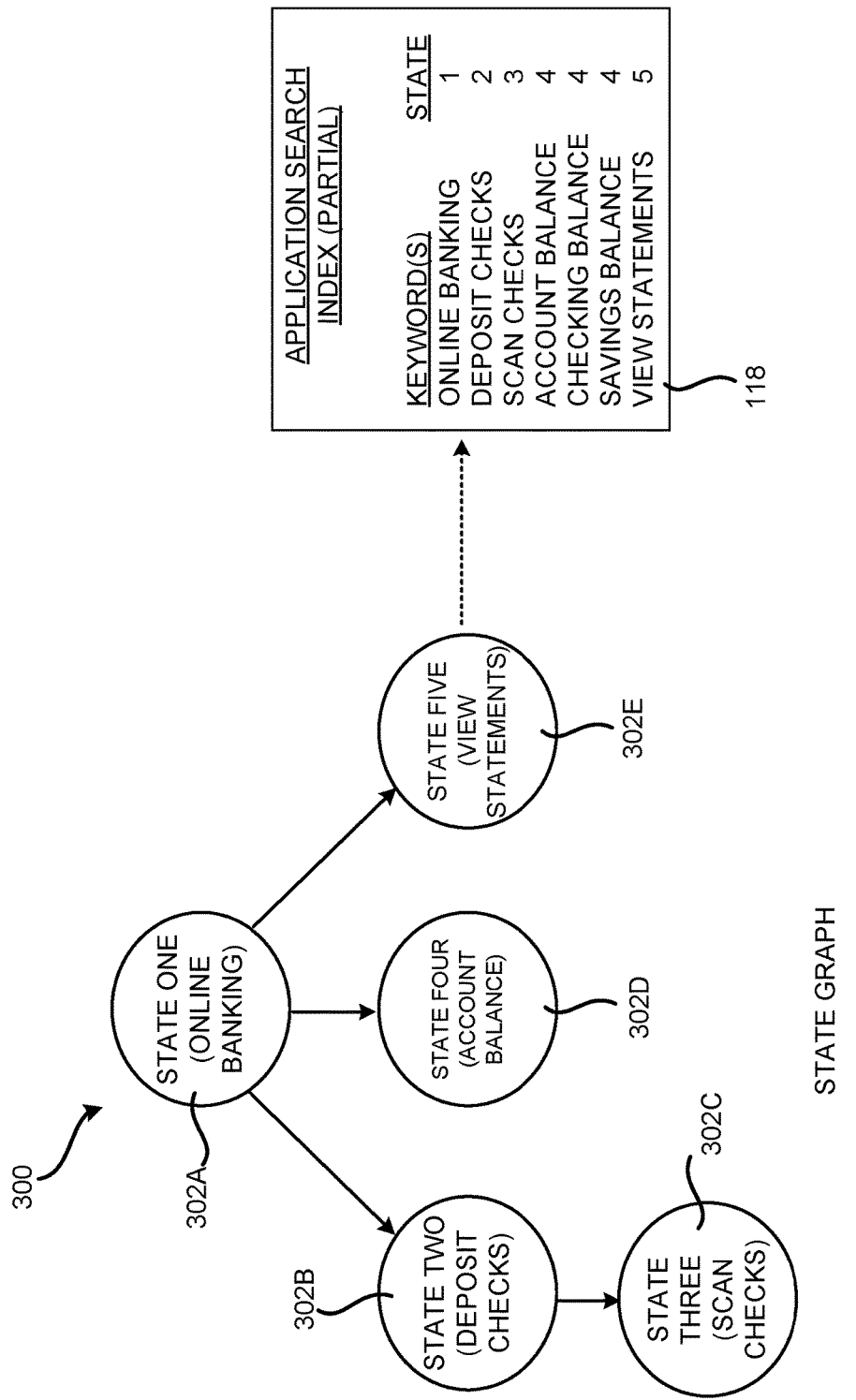
FIG. 2B shows an illustrative state graph corresponding to the user interface map shown in FIG. 2A and a partial application search index for the state graph.

FIG. 2B shows an illustrative state graph 300 corresponding to the UI map 200 shown in FIG. 2A and described above, along with a partial application search index 118 for the state graph 300. In the example state graph 300 shown in FIG. 2B, circles represent application states and lines represent links between the application states.

Particularly, state 302A corresponds to the screen display 202A in the UI map 200 shown in FIG. 2A. State 302B in the state graph 300 corresponds to the screen display 202B shown in FIG. 2A, and the line between state 302A and state 302B represents a link between the screen displays 202A and 202B. Similarly, the state 302C corresponds to the screen display 202C, and the line between state 302B and 302C represents a link between the screen displays 202B and 202C. Likewise, the state 302D corresponds to the screen display 202D, and the line between state 302A and 302D represents a link between the screen displays 202A and 202D. The state 302E corresponds to the screen display 202E, and the line between state 302A and 302E represents a link between the screen displays 202A and 202E.

As discussed above, the state graph 300 can be utilized to create the application search index 118. For example, and without limitation, the partial application search index 118 shown in FIG. 2B includes content obtained from the screen displays 202A-202E that is mapped to information identifying the corresponding application state. For instance, the text "ONLINE BANKING" that was obtained from the screen display 202A is mapped to state 302A in the state graph 300. The text "DEPOSIT CHECKS" that was obtained from the screen display 202B is mapped to state 302B in the state graph 300. Similarly, the text "SCAN CHECKS" that was obtained from the screen display 202C is mapped to state 302C in the state graph 300. Likewise, the text "ACCOUNT BALANCE", "CHECKING BALANCE", and "SAVINGS BALANCE" that was obtained from the screen display 202D is mapped to state 302D in the state graph 300. Finally, the text "VIEW STATEMENTS" that was obtained from the screen display 202E is mapped to state 302E in the state graph 300.

It is to be appreciated that the UI map 200, the state graph 300, and the partial application search index 118 shown in FIGS. 2A and 2B have been simplified for illustration and discussion purposes. Much more complex UI maps, state graphs, and application search indexes can be created and utilized with the technologies disclosed herein. Additionally, the state graph 300 and the application search index 118 can include additional information not illustrated in FIG. 2B. For example, and without limitation, data identifying the links between application states, memory addresses associated with application states, and/or other information can be stored in the state graph 300 and the application search index 118. This information, and/or potentially other types of information, can be utilized to a restore an application 114 to a particular application state. Additional details regarding this process are provided below.

Figure 3:
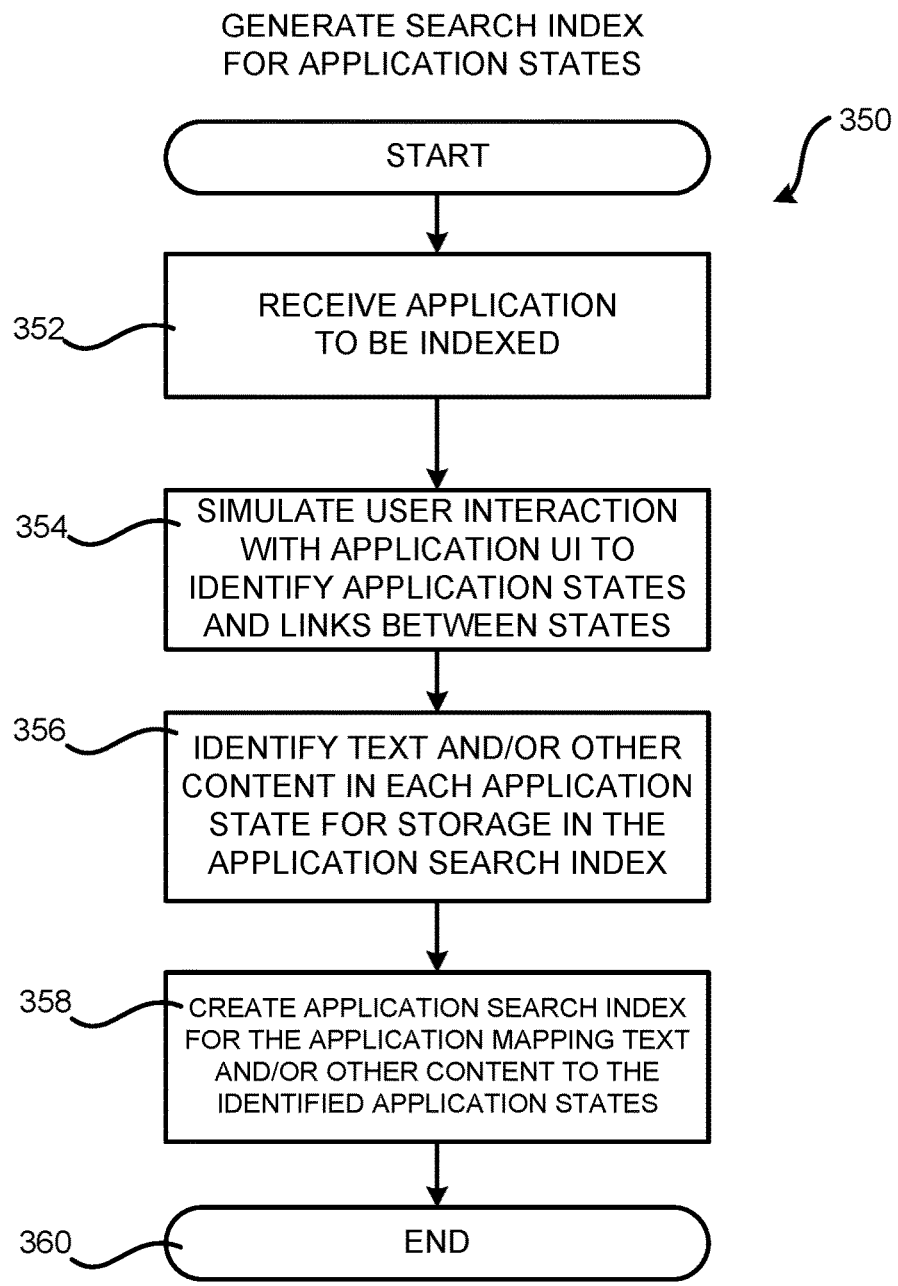
FIG. 3 is a flow diagram showing an illustrative routine for generating a search index for use in searching application states using programmatic application state indexing, according to one configuration disclosed herein.

FIG. 3 is a flow diagram showing an illustrative routine 350 for generating an application search index 118 for use in searching application states using programmatic application state indexing, according to one configuration disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 350 begins at operation 352, where the application store module 106 receives the submission of an application 114 from an application developer 108 for inclusion in the application store provided by the application store system 102. As discussed above, the application store module 106 can provide a web or other type of user interface for facilitating the submission of an application 114 for inclusion in the application store.

In response to receiving the submission of an application 114 for inclusion in the application store, the routine 350 proceeds from operation 352 to operation 354. At operation 354, the application indexing module 117, or another component in the application store system 102, simulates user interaction with the screen displays provided by the application 114 to identify the application states and the links between the application states. This process was described in detail above with regard to FIGS. 1, 2A, and 2B. From operation 354, the routine 350 proceeds to operation 356.

At operation 356, the application indexing module 117, or another component in the application store system 102, identifies content in each application state identified at operation 354 for storage in the application search index 118. Once the application states and associated content have been identified, the routine 350 then proceeds to operation 358, where the application indexing module 117, or another component in the application store system 102, creates the application search index 118. As discussed above, the application search index maps content found at each application state to the application states themselves. One example application search index 118 was discussed above with regard to FIG. 2B. From operation 358, the routine 350 proceeds to operation 360, where it ends.

Figure 4:
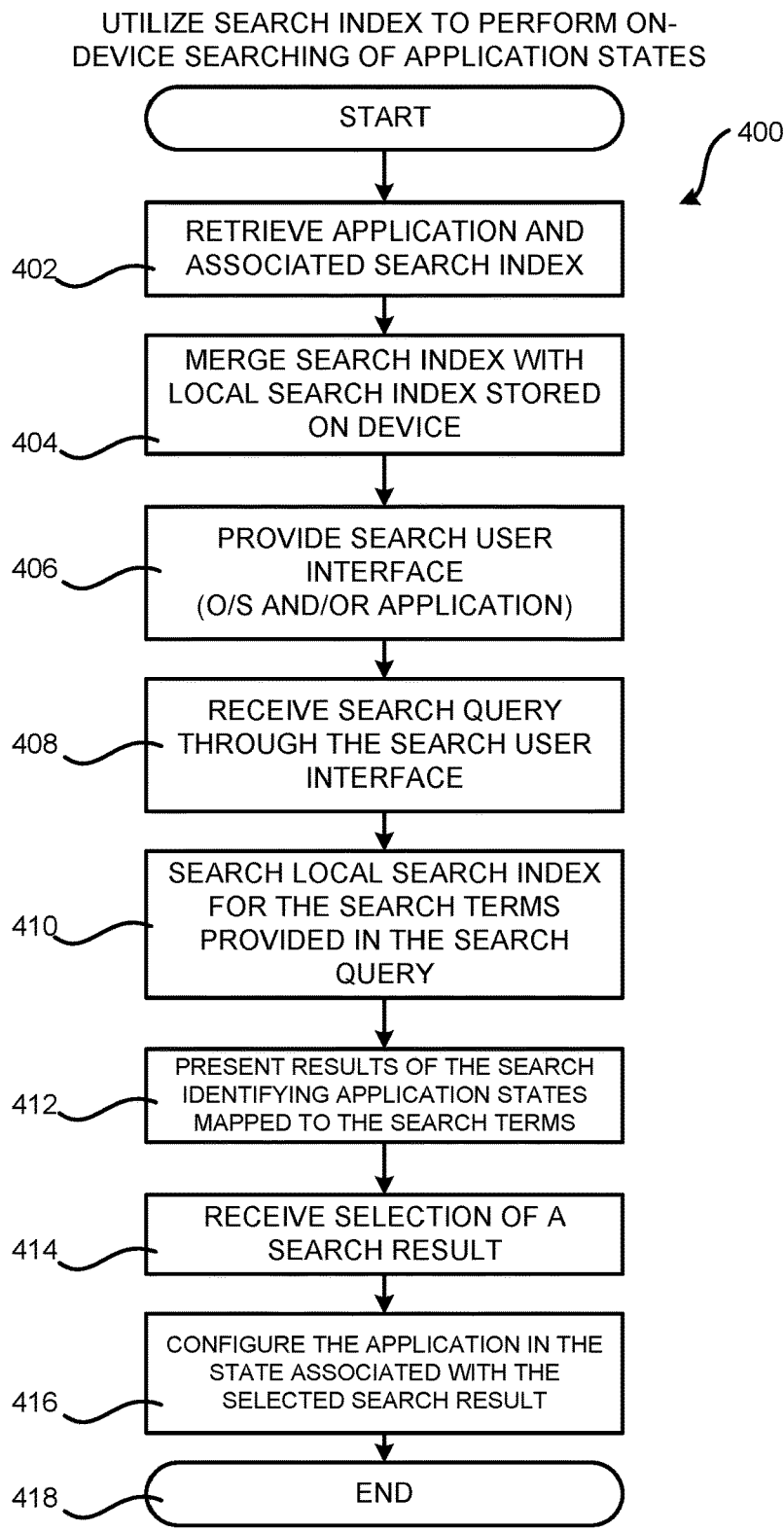
FIG. 4 is a flow diagram showing an illustrative routine for utilizing a search index generated using programmatic application state indexing to perform on-device search of application states, according to one configuration disclosed herein.

FIG. 4 is a flow diagram showing an illustrative routine 400 for utilizing an application search index 118 generated using programmatic application state indexing to perform on-device search of application states, according to one configuration disclosed herein. The routine 400 begins at operation 402, where the computing device 124 obtains the application 114 and its associated application search index 118 from the application store provided by the application store system 102. The routine 400 then proceeds from operation 402 to operation 404, where the computing device 124 merges the application search index 118 with the local search index 126 on the computing device 124. As discussed above, the local search index 126 includes the application search indexes 118 for other applications already installed on the computing device 124. As also discussed above, the application search index 118 and the local search index 126 need not be stored on the computing device 124 to enable the functionality described herein. Rather, these items could be stored in the application store system 102 (or another network-accessible storage location), and searched remotely. From operation 404, the routine 400 proceeds to operation 406.

At operation 406, the computing device 124 provides the search UI 128. In various configurations, the search UI 128 can be provided by the application 124, an operating system executing on the computing device 124, another application executing on the computing device 124, or another component. From operation 406, the routine 400 proceeds to operation 408, where a search query containing one or more search terms is provided through the search UI 128. A user, such as the customer 122, might provide the search query, for example.

From operation 408, the routine 400 proceeds to operation 410, where the computing device 124 searches the local search index 126 for the terms provided in the search query received at operation 408. If search terms are located in the local search index 126, the routine 400 proceeds to operation 412, where results of the search can be presented in the search UI 128 that identify the application states mapped to the matching search terms. In the example given above with regard to FIG. 2A, for instance, if a user searched for the terms "SCAN CHECKS", the state 302C would be identified in the local search index 126 and, accordingly, the search results would identify the state 302C corresponding to the screen display 202C.

From operation 412, the routine 400 proceeds to operation 414, where the search UI 128 can receive a selection of one of the search results, such as by the user that submitted the search query. Responsive thereto, the routine 400 proceeds from operation 414 to operation 416, where the computing device configures the application 114 associated with the selected search result in the application state, also associated with the selected search result. For instance, in the example give above, if a user selected a search result corresponding to the state 302C ("SCAN CHECKS"), the application 114 would be executed (if not already executing) and configured to present the screen display 202C. Various mechanisms can be utilized to configure the application 114 in this manner including, but not limited to, executing the application 114 from a memory address associated with the state 302C or selecting UI elements for placing the application in the state 302C (UI elements 204A and 204D in the example given above). Other mechanisms can also be utilized. From operation 416, the routine 400 proceeds to operation 418, where it ends.

Figure 5:
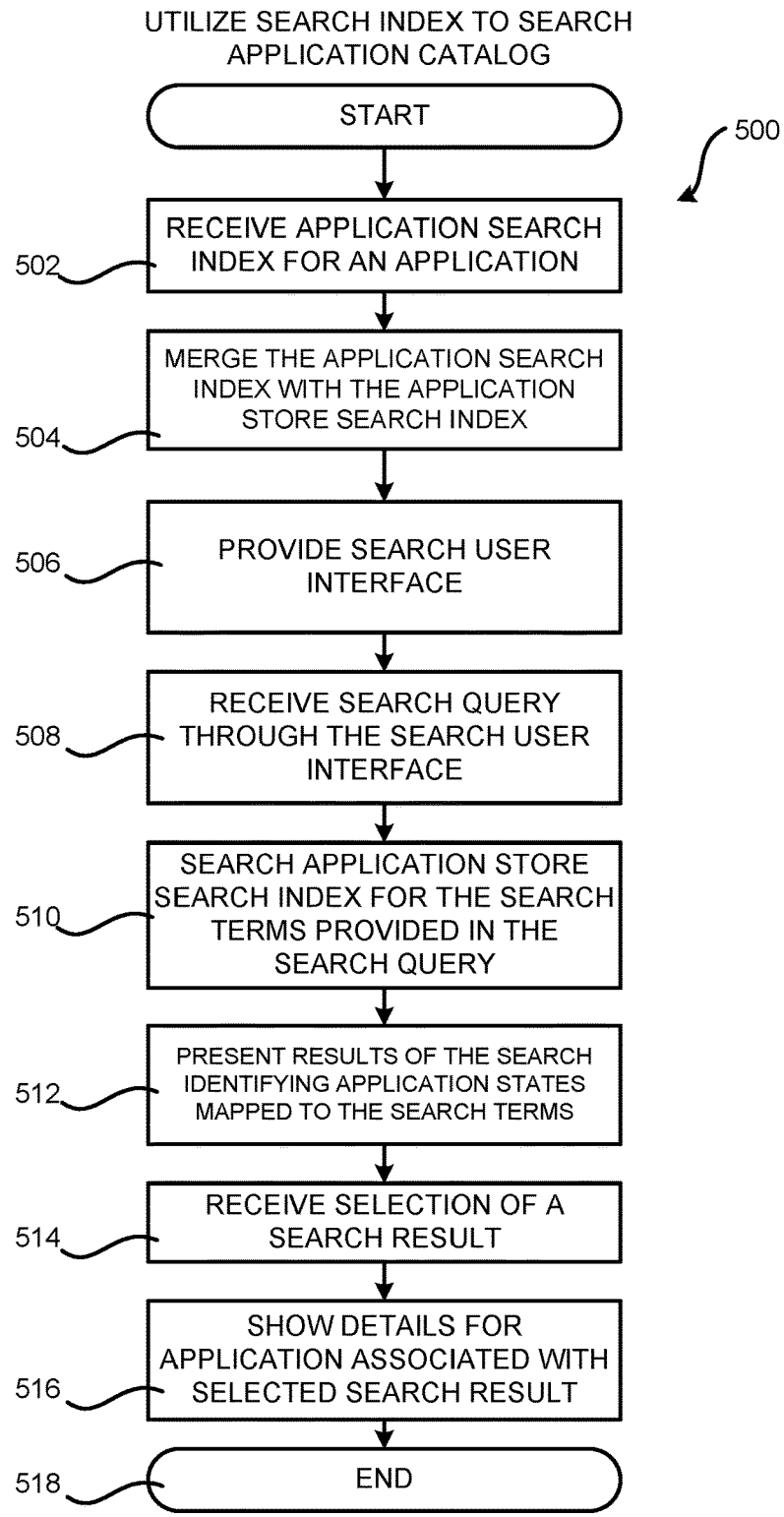
FIG. 5 is a flow diagram showing an illustrative routine for utilizing a search index generated using programmatic application state indexing to search an application catalog, according to one configuration disclosed herein.

FIG. 5 is a flow diagram showing an illustrative routine 500 for utilizing an application search index 118 generated using programmatic application state indexing to search for applications in an application catalog 116, according to one configuration disclosed herein. The routine 500 begins at operation 502, where the application search module 132, or another component in the application store system 102, receives the application search index 118 for an application 114. The routine 500 then proceeds from operation 502 to operation 504, where the received application search index 118 is merged with the application store search index 120. As discussed above, the application store search index 120 includes application search indexes 118 for other applications 114 identified in the application catalog 116.

From operation 504, the routine 500 proceeds to operation 506, where the computing device 124 provides a search UI 128. As discussed above, the search UI 128 can be provided by the application 114, an operating system executing on the computing device 124, or another component. The application search module 132 can also provide a UI for searching the application store search index 120. For example, a web-based UI can be provided for submitting a search query 130 to the application search module 132. From operation 506, the routine 500 proceeds to operation 508.

At operation 508, a search query 130 is received through the search UI 128 and transmitted to the application search module 132. Responsive thereto, the application search module 132 searches the application store search index 120 for the terms provided in the search query 130 received at operation 508. If search terms are located in the application store search index 120, the routine 500 proceeds to operation 512, where search results 134 can be transmitted to the computing device 124 and presented in the search UI 128 that identify the application states mapped to the matching search terms. In the example given above with regard to FIG. 2A, for instance, if a user searched for the terms "SCAN CHECKS", the state 302C would be identified in the application store search index 126 and, accordingly, the search results 134 would identify the state 302C corresponding to the screen display 202C.

From operation 512, the routine 500 proceeds to operation 514, where the search UI 128 can receive a selection of one of the search results 134, such as by the user that submitted the search query 130. Responsive thereto, the routine 500 proceeds from operation 514 to operation 516, where the application search module 132 can provide additional information about the application associated with the selected search result.

For instance, in the example give above, if a user selected a search result corresponding to the state 302C ("SCAN CHECKS"), the application search module 132 can obtain additional information regarding the online banking application that provides the state 302C from the application catalog 116 and provide that information in the search UI 128. This information might include, but is not limited to, a description of the application, screen captures for the application, a price for the application, reviews for the application and, potentially other or different information. The user submitting the search query 130 can also be permitted to purchase the application and download the application to their computing device 124 if not already installed. If the application is already installed, the user can select a search result to have the application configured in the state identified by the search result. From operation 516, the routine 500 proceeds to operation 518, where it ends.

It is to be appreciated that, in some configurations, the application states for an application 114 can be identified based upon a user's interaction with the application 114 on the computing device 124. For example, as a user navigates through the various screen displays of an application, an application search index 118 for the application can be built in the manner described above. In this configuration, it might be necessary for an operating system executing on the computing device 124 to monitor the user's interaction with the application 114 and expose this information to other programs. An application search index 118 created in this manner can be transmitted to the application indexing module 117 (or another component) for inclusion in the application store search index 120. This information can then be used in other ways, such as for computing a measure of the popularity of particular application states, for identifying application states that are rarely or never utilized by users, and/or in other ways.

In some configurations, the application store system 102 can also utilize the information stored in the application store search index 120 to cluster related applications based upon the content that they present in their respective application states. In this manner, applications can be clustered based upon the actual content exposed in different states rather than just upon developer-supplied metadata such as the name of an application or a description of the application.

Figure 6:
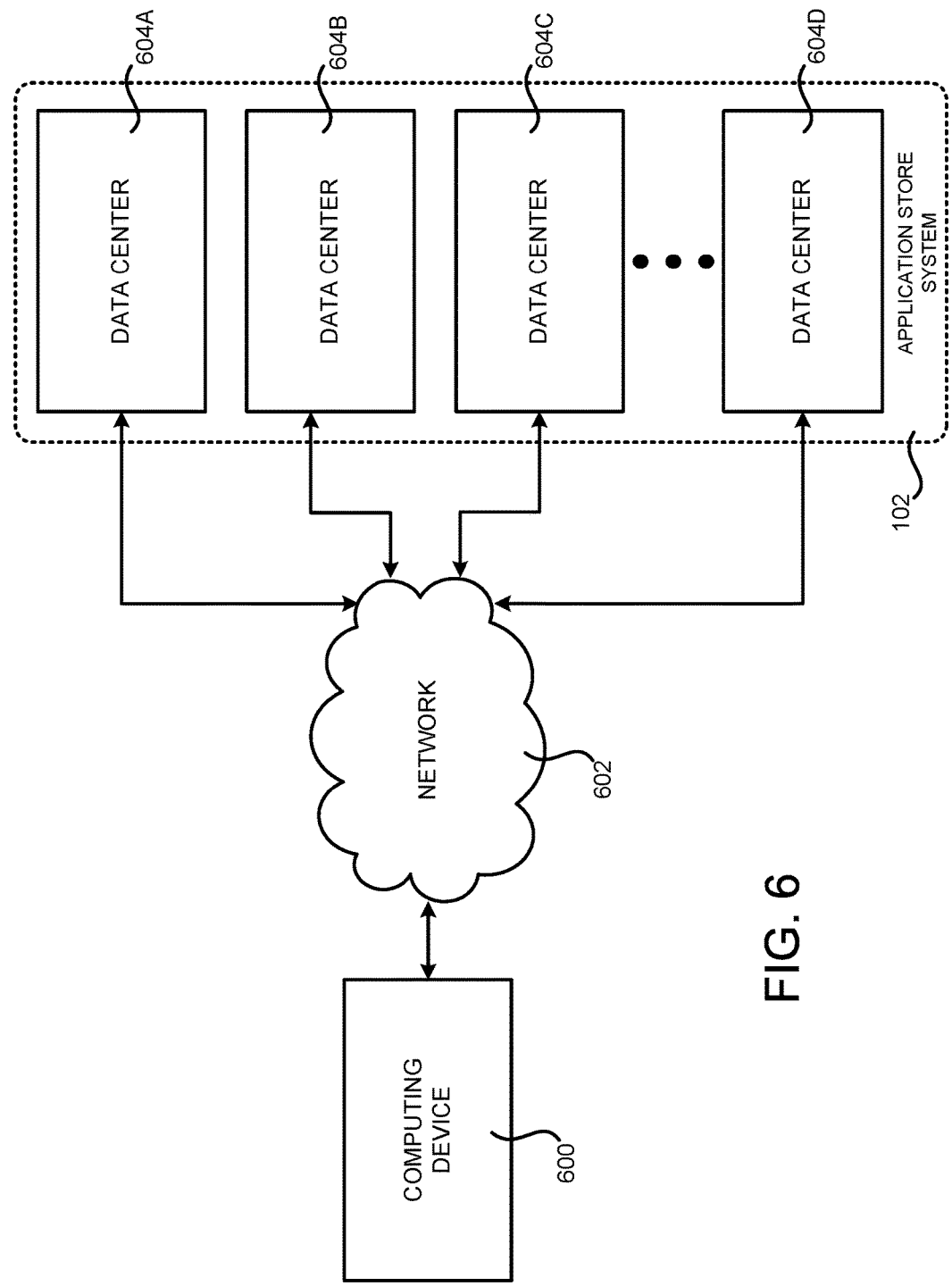
FIG. 6 is a system and network diagram that shows an illustrative operating environment including several data centers that can be configured to implement aspects of the functionality described herein.

FIG. 6 is a system and network diagram that shows one illustrative operating environment for the configurations disclosed herein that includes an application store system 102 that can be configured to provide the functionality described above. As discussed above, the application store system 102 can execute network services that provide computing resources for implementing the functionality disclosed herein. The computing resources implemented by the application store system 102 can be data processing resources, such as virtual machine ("VM") instances, data storage resources, networking resources, data communication resources, network services, and other types of resources.

The computing resources provided by the application store system 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The application store system 102 can also include and utilize other types of computing resources not mentioned specifically herein.

As also discussed above, the computing resources provided by the application store system 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The customers and other users of the application store system 102 can access the application store provided by the application store system 102 over a network 602, which can be a wide area communication network ("WAN"), such as the Internet, an intranet or an Internet service provider ("ISP") network or a combination of such networks. For example, and without limitation, a computing device 600 operated by a customer or other user of the application store system 102, such as the computing device 124, can be utilized to access the application store system 102 by way of the network 602. It should be appreciated that a local-area network ("LAN"), the Internet, or any other networking topology known in the art that connects the data centers 604 to remote customers and other users can be utilized. It should also be appreciated that combinations of such networks can also be utilized.

Figure 7:
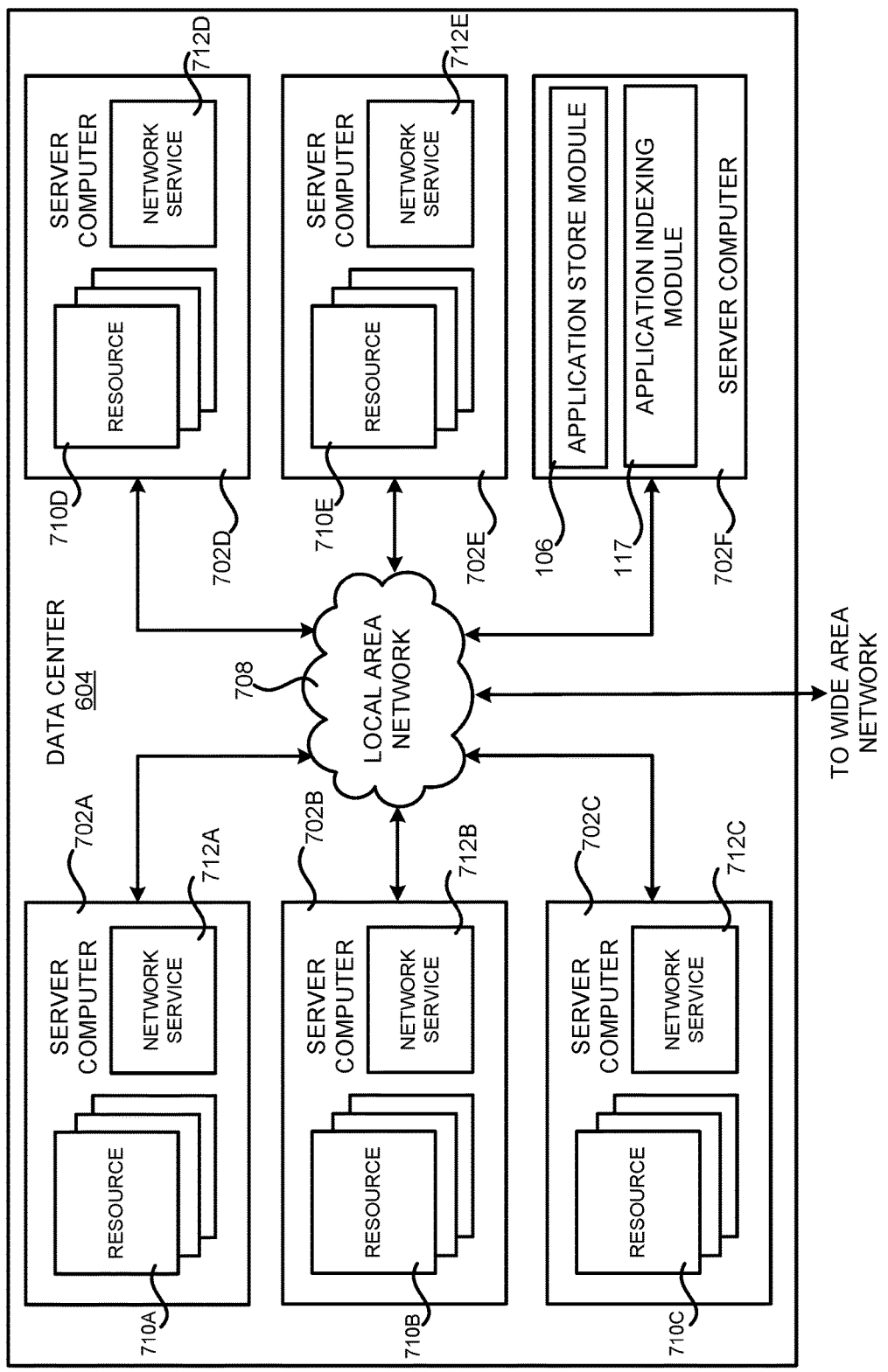
FIG. 7 is a computing system diagram illustrating a configuration for a data center that can be utilized to implement aspects of the technologies disclosed herein.

FIG. 7 is a computing system diagram that illustrates one configuration for a data center 604 that can be utilized to implement the application store module 106, the application indexing module 117, the application search module 132, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rackmount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. For example, and without limitation, the server computer 702F can be configured to execute the application store module 106 and the application indexing module 117, both of which have been described in detail above. The server computer 702F can also be configured to execute other components and/or to store data for providing some or all of the functionality described herein. In this regard, it should be appreciated that components or different instances of the application store module 106 and the application indexing module 117 can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
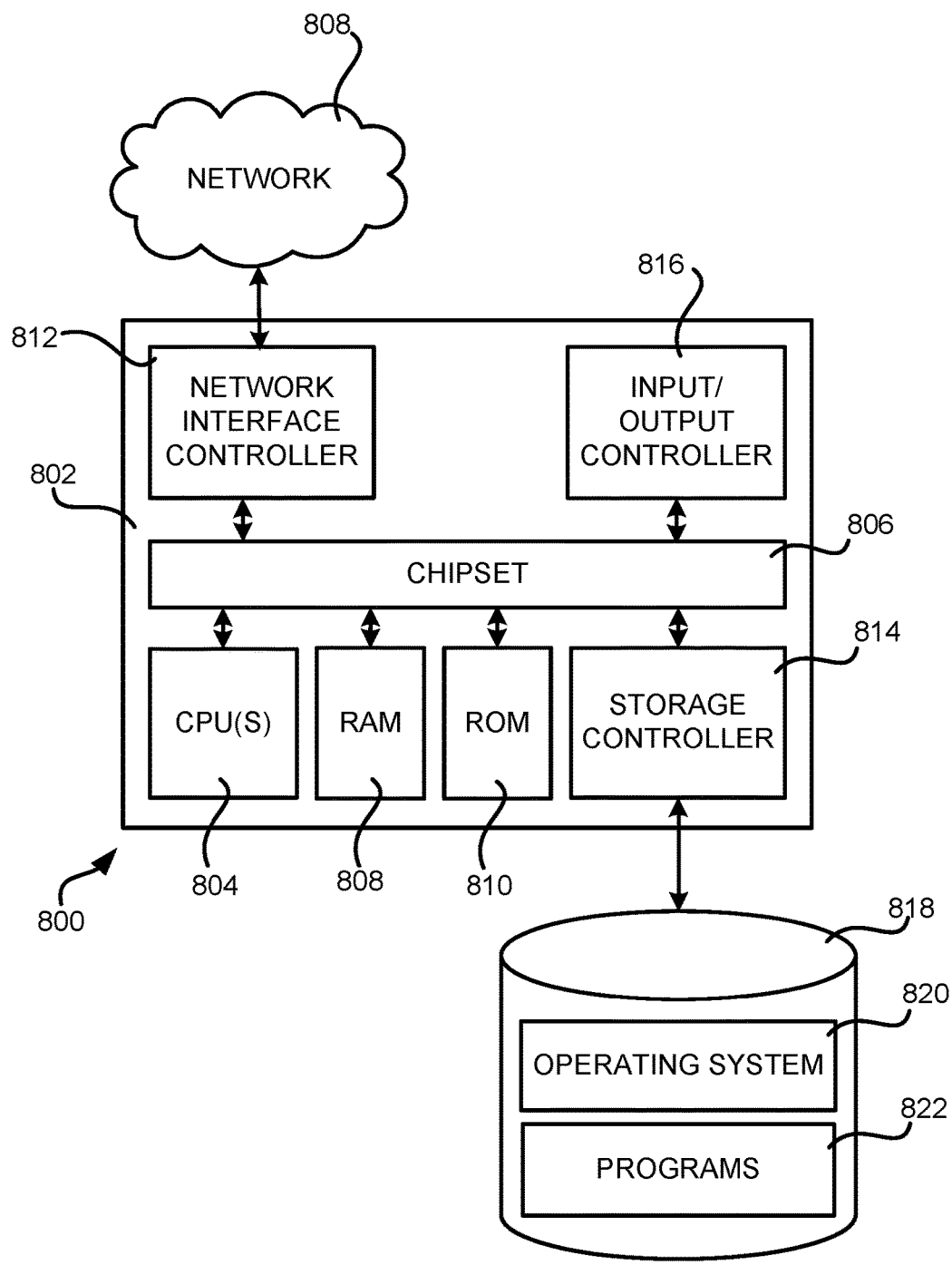
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-5. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for providing application search functionality using programmatic application state indexing have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:
1. An apparatus, comprising:
a processor; and
a non-transitory computer-readable storage medium having instructions stored thereupon which, when executed by the processor, cause the apparatus to:
programmatically simulate user interaction with user interface (UI) elements displayed by an application to identify a plurality of application states, the plurality of application states corresponding to unique screen displays generated by the application;
identify content associated with the plurality of application states;
determine, based in part on the content, at least one of a popularity or usage associated with individual ones of the plurality of application states;
generate an application search index that provides a mapping between the content and the plurality of application states;
merge the application search index into a local application store search index containing application search indexes for one or more other applications;
receive a search query comprising one or more search terms;

responsive to receiving the search query, search the local application store search index for the search terms to identify application states of the plurality of application states mapped to the search terms in the search query, wherein identifying the application states is based in part on at least one of the popularity or the usage associated with individual ones of the application states; and provide search results responsive to the search query that identify applications that provide the application states mapped to the search terms in the search query.

2. The apparatus of claim 1, wherein the non-transitory computer-readable storage medium has further instructions stored thereupon to programmatically identify the UI elements displayed by the application.

3. The apparatus of claim 1, wherein the non-transitory computer-readable storage medium has further instructions stored thereupon to provide the application search index to a computing device for searching of the plurality of application states on the computing device.

4. The apparatus of claim 1, wherein programmatically simulating user interaction with UI elements displayed by the application to identify the plurality of application states comprises:

systematically selecting UI elements on the unique display screens generated by the application to identify the unique display screens generated by the application and links between the unique display screens; and generating a UI map identifying the unique display screens and the links between the unique display screens.

5. The apparatus of claim 4, wherein the non-transitory computer-readable storage medium has further instructions stored thereupon to:

generate a state graph from the UI map, the state graph comprising data defining the plurality of application states and links between the plurality of application states; and generate the application search index from the state graph.

6. A computer-implemented method, comprising:

receiving, at a computing device, an application and an associated application search index mapping content to a plurality of application states provided by the application, wherein the application search index is generated by programmatically simulating user interaction with user interface (UI) elements displayed by the application to identify the plurality of application states;

determining, based in part on the content, at least one of a popularity or usage associated with individual ones of the plurality of application states;

merging, at the computing device, the application search index with a local search index, the local search index containing application search indexes for one or more other applications installed on the computing device;

providing, at the computing device, a UI for receiving a search query comprising one or more search terms;

responsive to receiving the search query at the computing device, searching the local search index for the search terms to identify application states of the plurality of application states mapped to the search terms in the search query, wherein identifying the application states is based in part on at least one of the popularity or the usage associated with individual ones of the application states; and presenting, at the computing device, search results responsive to the search query that identify applications that provide the application states mapped to the search terms in the search query.

7. The computer-implemented method of claim 6, further comprising:

receiving a selection of a search result; and causing an application associated with the selected search result to be configured on the computing device in an application state associated with the search result.

8. The computer-implemented method of claim 6, wherein the application search index is generated by an application store system responsive to submission of the application for inclusion in an application store provided by the application store system.

9. The computer-implemented method of claim 6, wherein the UI elements displayed by the application are programmatically identified.

10. The computer-implemented method of claim 6, further comprising, responsive to receiving the search query at the computing device, causing a search to be made of an application store search index for the search terms, the application store search index comprising the application search index and application search indexes for a plurality of applications available from an application store.

11. The computer-implemented method of claim 6, wherein programmatically simulating user interaction with UI elements displayed by an application to identify the application states comprises:

systematically selecting UI elements on the unique display screens generated by the application to identify the unique display screens generated by the application and links between the unique display screens; and generating a UI map identifying the unique display screens and the links between the unique display screens.

12. The computer-implemented method of claim 11, wherein a state graph is generated from the UI map, the state graph comprising data defining the plurality of application states and links between the plurality of application states, and wherein the application search index is generated from the state graph.

13. A non-transitory computer-readable storage medium having instructions stored thereupon which are executable by a processor and which, when executed, cause the processor to:

programmatically identify a plurality of application states provided by an application by interacting with a user interface (UI) provided by the application;

identify content associated with the plurality of application states;

determine, based in part on the content, at least one of a popularity or usage associated with individual ones of application states of the plurality of application states;

generate an application search index that provides a mapping between the content and the plurality of application states; and merge the application search index into a local application store search index containing application search indexes for one or more other applications.

14. The non-transitory computer-readable storage medium of claim 13, wherein programmatically identifying the plurality of application states provided by the application by interacting with a user interface (UI) provided by the application comprises programmatically simulating user interaction with UI elements displayed by the application to identify the plurality of application states, the plurality of application states corresponding to unique screen displays generated by the application.

15. The non-transitory computer-readable storage medium of claim 14, having further instructions stored thereupon to programmatically identify the UI elements displayed by the application.

16. The non-transitory computer-readable storage medium of claim 13, wherein programmatically simulating user interaction with UI elements displayed by the application to identify the plurality of application states comprises:
   systematically selecting UI elements on the unique display screens generated by the application to identify the unique display screens generated by the application and links between the unique display screens; and
   generating a UI map identifying the unique display screens and the links between the unique display screens.

17. The non-transitory computer-readable storage medium of claim 16, wherein a state graph is generated from the UI map, the state graph comprising data defining the plurality of application states and links between the plurality of application states, and wherein the application search index is generated from the state graph.

18. The non-transitory computer-readable storage medium of claim 13, having further instructions stored thereupon to:
   receive a search query comprising one or more search terms;
   responsive to receiving the search query, search the local application store search index for the search terms to identify application states of the plurality of application states mapped to the search terms in the search query, wherein identifying the application states is based in part on at least one of the popularity or the usage associated with individual ones of the application states; and
   provide search results responsive to the search query that identify applications that provide the application states mapped to the search terms in the search query.

19. The non-transitory computer-readable storage medium of claim 13, having further instructions stored thereupon to provide the application search index to a computing device for searching of the plurality of application states on the computing device.

20. The non-transitory computer-readable storage medium of claim 13, wherein the application search index is generated by an application store system responsive to submission of the application for inclusion in an application store provided by the application store system.

\* \* \* \* \*